US010024566B2

(12) United States Patent
Shrubsole et al.

(10) Patent No.: US 10,024,566 B2
(45) Date of Patent: Jul. 17, 2018

(54) USER INTERFACE WITH ADAPTIVE EXTENT OF USER CONTROL BASED ON USER PRESENCE INFORMATION

(71) Applicant: PHILIPS LIGHTING HOLDING B.V., Eindhoven (NL)

(72) Inventors: Paul Anthony Shrubsole, Arnhem (NL); Alexandre Georgievich Sinitsyn, Veldhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 240 days.

(21) Appl. No.: 14/784,051

(22) PCT Filed: Apr. 4, 2014

(86) PCT No.: PCT/IB2014/060412
§ 371 (c)(1),
(2) Date: Oct. 13, 2015

(87) PCT Pub. No.: WO2014/167465
PCT Pub. Date: Oct. 16, 2014

(65) Prior Publication Data
US 2016/0069585 A1    Mar. 10, 2016

Related U.S. Application Data

(60) Provisional application No. 61/810,774, filed on Apr. 11, 2013.

(51) Int. Cl.
*F24F 11/00*        (2018.01)
*G05B 13/02*        (2006.01)
(Continued)

(52) U.S. Cl.
CPC .......... *F24F 11/0086* (2013.01); *F24F 11/30* (2018.01); *G05B 13/0205* (2013.01);
(Continued)

(58) Field of Classification Search
CPC ... F24F 11/001; F24F 11/0034; F24F 11/0086
See application file for complete search history.

(56) References Cited

U.S. PATENT DOCUMENTS

| 9,298,197 B2* | 3/2016 | Matsuoka | G05D 23/1917 |
| 2007/0138307 A1* | 6/2007 | Khoo | F24F 11/006 236/1 C |

(Continued)

FOREIGN PATENT DOCUMENTS

| WO | 2006090546 A2 | 8/2006 |
| WO | 2010079388 A1 | 7/2010 |
| WO | 2010143089 A1 | 12/2010 |

OTHER PUBLICATIONS

"Technology Company Creates Showcase Intelligent Building—Gruppo RETI Uses CISCO Unified Communications to Help Develop New Business Opportunities in Building Automation," Cisco, Customer Case Study, 2007 (6 pages).

(Continued)

*Primary Examiner* — Mark Connolly
(74) *Attorney, Agent, or Firm* — Meenakshy Chakravorty

(57) ABSTRACT

A control device (110) for controlling the environment in a region (102) within a structure (104) by means of controlling operation of a control system (120), which is adapted to adjust at least one property of the environment in the region (102), is disclosed. The control device comprises a user interface (112) adapted to selectively indicate to a user a range of available values representing at least one property of the environment in the region (102) that is adjustable by the control system (120) at least based on presence information of any persons being present within the region (102) such that the extent of control of the environment in the region (102) by means of the control device (120) that is thereby enabled the user is based at least partly on the presence information.

14 Claims, 2 Drawing Sheets

(51) Int. Cl.
  *G05B 15/02* (2006.01)
  *H04L 12/28* (2006.01)
  *H05B 37/02* (2006.01)
  *H04L 29/08* (2006.01)
  *F24F 11/30* (2018.01)
  *F24F 110/00* (2018.01)
  *F24F 120/10* (2018.01)
  *F24F 120/20* (2018.01)
  *F24F 11/52* (2018.01)

(52) U.S. Cl.
  CPC ............ *G05B 15/02* (2013.01); *H04L 12/282* (2013.01); *H04L 67/18* (2013.01); *H05B 37/0227* (2013.01); *F24F 11/52* (2018.01); *F24F 2110/00* (2018.01); *F24F 2120/10* (2018.01); *F24F 2120/20* (2018.01)

(56) References Cited

U.S. PATENT DOCUMENTS

| | | |
|---|---|---|
| 2008/0281472 A1 | 11/2008 | Podgorny et al. |
| 2010/0223555 A1 | 9/2010 | Zellner et al. |
| 2013/0234840 A1* | 9/2013 | Trundle .............. F24F 11/0086 340/12.53 |
| 2013/0331087 A1* | 12/2013 | Shoemaker ........... H04L 67/125 455/420 |
| 2015/0296594 A1* | 10/2015 | Blum ................ H05B 37/0227 315/158 |
| 2015/0338117 A1* | 11/2015 | Henneberger ......... G05B 15/02 700/276 |
| 2016/0069585 A1* | 3/2016 | Shrubsole ............ H04L 12/282 700/276 |

OTHER PUBLICATIONS

Lai, et al., "BlueSpace: personalizing workspace through awareness and adaptability," Int. J. Human-Computer Studies (2002) 57, 415-428 (14 pages).

Lighting Research Center, "Private Office Lighting Controls," Demonstration and Evaluation of Lighting Technologies and Applications, Lighting Research Center, Issue 5, 1999 (2 pages).

Toftum, J., "Central Automatic Control or Distributed Occupant Control for Better Indoor Environment Quality in the Future," Building and Environment 45 (2010) 23-28 (6 pages).

Want, R., et al., "The Active Badge Location System," ACM Transactions on Information Systems, vol. 10, No. 1, Jan. 1992, pp. 91-102 (12 pages).

Yong, C., et al., "Co-ordinated Management of Intelligent Pervasive Spaces," date unknown, (6 pages).

* cited by examiner

USER INTERFACE WITH ADAPTIVE EXTENT OF USER CONTROL BASED ON USER PRESENCE INFORMATION

CROSS-REFERENCE TO PRIOR APPLICATIONS

This application is the U.S. National Phase application under 35 U.S.C. § 371 of International Application No. PCT/IB2014/060412, filed on Apr. 4, 2014, which claims the benefit of U.S. Provisional Patent Application No. 61/810,774, filed Apr. 11, 2013. These applications are hereby incorporated by reference herein.

FIELD OF THE INVENTION

The present invention generally relates to control devices. Specifically, the present invention relates to a control device for controlling the environment in a region within a structure by means of controlling operation of a control system adapted to adjust at least one property of the environment in the region. The present invention further relates to a user interface for such a control device. The structure may for example comprise a building. The region may for example comprise one or more rooms in a workplace such as an office or in a home.

BACKGROUND OF THE INVENTION

Offices, in particular open plan offices, generally offer limited individualized or personal control of the office environment in terms of e.g. lighting, heating, ventilation, etc., for the respective office workers or users. At the same time, there are studies which have indicated that users wish to feel in control of their environment, which if achieved may possibly result in an increase in their wellbeing and productivity. For example, studies carried out in the past decades in the fields of environmental psychology, energy efficient lighting, and building automation indicate that there is a significant variation in user preferences with respect to lighting, heating, ventilation, etc., within the workplace or office. However, little is in general offered to office workers in terms of individualized or personal control since, particularly in the case of open plan offices, local changes in properties of the environment in the office by one office worker may negatively affect the (perceived) comfort of other office workers in the office, who may possibly have different preferences with respect to lighting, heating, cooling, ventilation, etc., within the office. Furthermore, applications such as energy saving automation solutions (e.g. so called building automation systems), which are constructed so as to in principle be able to provide a certain degree or extent of energy saving, have been shown to be possibly less optimal with respect to saving energy in practice. One of the reasons for this is because such applications generally do not take into account personal comfort and satisfaction of occupants at the locations where the applications are installed. For example, people may deliberately try to sabotage or override the default automatic behavior of such applications because they feel that their own comfort is being compromised by the default automatic behavior of the applications.

With the advent of new and improved technologies for varying properties of the environment in a region e.g. in an office or a home, users may wish to have more control of his or her environment e.g. so as to be able to create a variety of different atmospheric scenes. This development may lead to an increased complexity in user interfaces for controlling the environment in the region. For example, an increased complexity in user interfaces for home control systems (e.g. for so called smart homes) has been observed. One approach for mitigating the increased complexity in the user interfaces is to offer the user a relatively large freedom to choose the desired atmospheric scene by permitting the user to control relatively low-level parameters or properties such as light intensity, temperature, speed of fan rotation, etc. Another approach is to pre-program settings for the most common or used atmospheric scenes, such as in SchoolVision and Dynalite systems provided by Philips.

By way of example, WO 2010/143089 A1 discloses systems and apparatus for deriving, modifying and sharing personal preferences applicable to controllable lighting networks.

SUMMARY OF THE INVENTION

However, there is still a need in the art for an improved way to provide personal or individualized control of the environment in a region within a structure. There is further a need in the art for reducing the complexity of user interfaces in control systems for controlling the environment in a region within a structure, which control systems for example may include office or home control systems.

In view of the above discussion, a concern of the present invention is to provide a user interface and a control device which are capable of providing improved personal or individualized control of the environment in a region within a structure as compared to known user interfaces and control devices.

A further concern of the present invention is to provide a user interface for use in controlling the environment in a region within a structure, which user interface exhibits a reduced complexity as compared to known user interfaces.

A further concern of the present invention is to provide a user interface for use in controlling the environment in a region within a structure, which user interface is easier to use as compared to known user interfaces.

To address at least one of these concerns and other concerns, a control device, a user interface and a system in accordance with the independent claims are provided. Preferred embodiments are defined by the dependent claims.

According to a first aspect of the present invention, there is provided a control device for controlling the environment in a region within a structure by means of controlling operation of a control system adapted to adjust at least one property of the environment in the region. The control device comprises a user interface, which is adapted to selectively indicate to a user a range of available values representing at least one property of the environment in the region that is adjustable by the control system, and enable the user to control the represented at least one property, whereby the control device is provided with user input. The control device comprises a communication unit adapted to adjust the at least one property by means of communicating a control signal corresponding to the user input to the control system. The user interface is adapted to selectively indicate to the user a range of available values representing at least one property of the environment in the region that is adjustable by the control system at least based on presence information of any persons being present within the region such that the extent of control of the environment in the region by means of the control device that is thereby enabled the user is based at least partly on the presence information.

According to a second aspect of the present invention, there is provided a user interface for a control device, which is for controlling the environment in a region within a structure by means of controlling operation of a control system adapted to adjust at least one property of the environment in the region. The user interface is adapted to selectively indicate to a user a range of available values representing at least one property of the environment in the region that is adjustable by the control system, and enable the user to control the represented at least one property, whereby the control device is provided with user input. The control device is adapted to adjust the at least one property by means of communicating a control signal corresponding to the user input to the control system. The user interface is adapted to selectively indicate to the user a range of available values representing at least one property of the environment in the region that is adjustable by the control system at least based on presence information of any persons being present within the region such that the extent of control of the environment in the region by means of the control device that is thereby enabled the user is based at least partly on the presence information.

The level of user control of the environment in the region that is provided by the user interface can hence be adapted based at least partly on the presence information of any persons being present within the region, i.e. presence information of the user and/or any other persons possibly being present within the region. For example, the amount, type and/or numerical range of control options that are indicated to the user by the user interface can be controllably selected based at least partly on the presence information of any persons being present within the region.

In a case where there are several users in the region, and where each user has a control device such as described above, by adapting the level of user control of the environment in the region that is provided by the user interfaces of the respective control devices based at least partly on the presence information of any persons being present within the region, there may be no single user or person within the region that is dominating or owning full control of the environment in the region. Rather, the level of user control of the environment in the region for each user may be set so as to provide a balance between a desire of the users to have personal or individualized control of the environment in the region and the possibly different preferences of the different users with respect to properties of the environment in the region. Hence, by adapting the level of user control of the environment in the region that is provided by the user interface, based at least partly on the presence information of any persons being present within the region, presence information of any other users possibly being located within the region may influence the scope of available control actions for each user for controlling the environment in the region.

By adaptation of the level of user control of the environment in the region that is provided by the user interface, based at least partly on the presence information of any persons being present within the region, the control device and user interface may facilitate or enable a more flexible approach to personal or individualized control of properties of the environment of the region by means of the adaptive user interface, which e.g. may offer greater extent of control of properties of the environment when other persons (other than the user) are not present in the region or located relatively far from the user within the region. Presence, location and/or other contextual information within the region may be utilized for rendering or creating the user interface, in order to enable control the control system, e.g. so as to enable controlling lighting, shading, heating, air quality and/or air circulation, etc., locally and/or globally within the region. At the same time, by adaptation of the level of user control of the environment in the region that is provided by the user interface, based at least partly on the presence information of any persons being present within the region, the user may be presented with mostly or only the most relevant or meaningful control options via the user interface. Thereby, the complexity of the user interface may be reduced, which in turn may facilitate or enable avoiding the user being overburdened with control options.

Principles of embodiments of the present invention will now be described with reference to an example where the user is an office worker wishing to adjust temperature within a region, which according to the example is one or more rooms in an office.

To begin with, the user enters the office and occupies a workspace (e.g. the user sits down at a desk).

Next, the user may prefer warmer conditions than the default conditions in the office which govern temperature in the office, and therefore wishes to increase the temperature globally or at least close to the user by a few °C., e.g. by 4° C., in order to feel more comfortable.

The user activates the control device, which may e.g. be a personalized building control interface in a smartphone or laptop.

The user interface of the control device is generated with control options that are dynamically populated based on the presence and/or location of the user and/or of any other persons possibly being located in the office. The location of the user may be determined for example by means of a laptop docking location or by means of a position determined by the smartphone, as known in the art.

If occupancy of neighboring regions of the user is relatively low, the user interface can be dynamically adapted so as to provide a relatively high possible set-point for the temperature close to the user's location, otherwise the user interface can be dynamically adapted so as to provide a set-point for the temperature close to the user's location that is only at or substantially at an average expected value for the desired temperature in the office, e.g. for energy saving.

The same of similar principles may apply to cases where the user wishes to adjust other properties of the environment in the region (e.g. an office), e.g. lighting properties, air circulation properties, etc.

The control device may itself be located within the region, such as at a location within the region that is associated with or corresponding to the user of the control device, e.g. at a desk or workspace assigned to the user.

In the context of the present application, by the extent of control of the environment in the region (by means of the control device) that is enabled the user being based at least partly on the presence information, it is meant that the level of user control of the environment in the region that is provided by the user interface, e.g. by selective population of the user interface with a controllable amount of control options, is based at least partly on the presence information.

A relatively high extent of control of the environment may entail that the user is enabled to control both aspect(s) of the environment in the region close to or at the user's location as well as aspect(s) of the environment in the region further away from the user's location, while a relatively low extent of control of the environment may entail that the user is enabled to control only aspect(s) of the environment in the region close to or at the user's location.

In alternative or in addition, a relatively high extent of control of the environment may entail that the user is enabled to control a property or properties of the environment in the region within a relatively wide range of available values, e.g. about an expected or average value, representing the property or properties of the environment of the region, while a relatively low extent of control of the environment may entail that the user is enabled to control a property or properties of the environment in the region only within a relatively narrow range of available values, e.g. about an expected or average value, representing the property or properties of the environment of the region.

In alternative or in addition, a relatively high extent of control of the environment may entail that the user is enabled to control relatively many different types of properties of the environment in the region, e.g. including properties relating to lighting, thermal conditions, sound level, humidity, and/or air circulation in the region, while a relatively low extent of control of the environment may entail that the user is enabled to control only a relatively small number of different types of properties of the environment in the region.

For example with respect to controlling lighting within the region, when there is a relatively large number of persons other than the user located within the region, the user may be limited to adjusting (local) task lighting and possibly some overhead lighting above the user's location, e.g. with respect to brightness, whereas when there are fewer persons other than the user located within the region, the control options with respect to lighting for the user may be increased, e.g. so as to enable adjusting lighting conditions further away from the user and/or to enable adjusting a wider range of lighting aspects such as brightness, glare, color temperature, and/or intensity, etc. of natural or artificial light within the region.

The user interface may for example be configured to adapt the number, and/or type of properties, and/or the range of available values of the respective properties which are indicated to the user by the user interface, at least based on the presence information.

The control device may for example include or be constituted by a laptop, a mobile telephone such as a so called 'smartphone', and/or some other type of user device or wireless transmit/receive unit.

In the context of the present application, by a smartphone it is meant a mobile telephone built on a mobile operating system having functionality that may include one or several of a portable media player, an imaging device such as a digital camera, a Global Positioning System (GPS) navigation unit, etc., combined with the functionality of a mobile telephone. Smartphones may include a user interface e.g. including a touch-sensitive screen or the like, capable of displaying e.g. web browsers that can display standard web pages as well as web pages optimized for viewing by a mobile device, and be capable of transmitting and receiving signals, data, etc., e.g. by means of Wi-Fi. The mobile operating systems used by a smartphone may include Android from Google, iOS from Apple, Symbian from Nokia, BlackBerry OS from RIM ("Research in Motion"), etc.

The indication by the user interface may for example be visual, auditory, tactile, or any combination thereof. Hence, the user interface may be adapted to, visually, tactilely and/or auditory, selectively indicate to a user a range of available values representing at least one property of the environment in the region that is adjustable by the control system.

The user interface may for example include or be constituted by a graphical user interface, a web-based user interface (e.g. a user interface which accepts input and provides output by generating web pages which are transmitted via the Internet and viewed by the user e.g. using a web browser program), and/or a touch screen (e.g. based on capacitive or resistive techniques), as known in the art. This list of user interfaces is not exhaustive and the user interface may be of any appropriate type.

The region, or space, may be an at least partially bounded or enclosed region such as one or more rooms in the structure, which one or more rooms may be shared by several persons possibly including the user of the user interface and/or the control device.

The region may for example located in a building. The control system may include a building management system for controlling and/or monitoring mechanical and/or electrical equipment in the building. In the following, embodiments of the present invention are described mainly with reference to an example where the region is located in a building and e.g. includes, or is constituted by, one or more rooms in the building. The one or more rooms may for example be one or more offices, one or more rooms in a home, or one or more rooms in a public region. However, it is to be understood that this example is merely for describing principles of embodiments of the present invention and is not to considered as limiting the present invention. Rather, the present invention encompasses cases where the region is not necessarily located in a building, and possibly being included in, or constituted by, one or more rooms in the building. For example, the region may for example be included in a vehicle or a non-building structure such as a factory, a warehouse, a power station, a refinery, etc.

The control system may be adapted to control for example lighting, heating, cooling and/or air circulation in the region. The at least one property of the environment in the region may for example include at least one lighting property, at least one thermal property, at least one acoustic property, humidity and/or an air circulation property. The control system may for example include a building management system for controlling and/or monitoring mechanical and/or electrical equipment in the building.

The presence information may for example include information on presence of any persons being present within the region.

In alternative or in addition, the presence information may include information on location of any persons being present within the region. The location of a person present within the region may be 'physical', e.g. so as to constitute the actual physical location of a particular user or person within the region. In alternative or in addition, the location of a person present within the region may be 'logical', e.g. being constituted by a location of a work region and/or desk within the at partially enclosed region belonging or corresponding to a particular user or person.

In alternative or in addition, the presence information may include information on identity of any persons being present within the region. The presence information may hence include information identifying a particular user or person being present within the region.

In alternative or in addition, the user interface may be adapted to controllably indicate to a user a range of available values representing at least one property of the environment in the region, which at least one property is adjustable by the control system.

Information other than the presence information may be utilized in the selective, and/or possibly controllable, indication by the user interface to the user of a range of available values representing at least one property of the environment in the region that is adjustable by the control system. The extent of control of the environment in the region by means of the control device that is enabled the user may hence be based on additional information other than the presence information. The further information may for example include current properties or history of properties (e.g. sensed properties) of the environment in the region, properties of the environment exterior to the region (e.g., weather conditions), information on activity of any person present within the region (e.g. tasks that are performed by persons present within the region, or motion or posture, etc., of any person present within the region), etc. This list is not exhaustive. Any such further information may be sensed by appropriate sensing means, which for example may be included in the control system.

According to an example, the indication by the user interface to the user of a range of available values representing at least one property of the environment in the region that is adjustable by the control system may be further based on signaling or indications received from devices which are adapted to adjust properties of the environment in the region (these devices e.g. being included in the control system). By way of example, light sources arranged to provide illumination within the region may be adapted to emit so called coded light, e.g. modulated light, for carrying information. Modulation of light may for example be with respect to frequency, amplitude, etc.

An example scenario could be as follows. A light source, e.g. a ceiling luminaire, capable of providing task lighting may be controlled via an augmented display application that can be executed in or indicated by the user interface of the control device, e.g. the display screen on a smartphone, using coded light. For example, the user may view the ceiling luminaire on the user interface (or display screen of the smartphone, e.g. using the smartphone's built-in camera). Based on coded light received by the control device, e.g. by the communication unit, from the ceiling luminaire, the user interface may be adapted so as to indicate an overlay of a visualization of the control possibilities of the ceiling luminaire, e.g. superposed a view of the ceiling luminaire on the user interface, by means of identification of the ceiling luminaire using the received coded light. When the user views a light source capable of transmitting coded light that is associated with or corresponds to the user (e.g. a light source that is intended mainly for use by the user), the user interface may provide an extent or range of control options for lighting properties of the light source that may be limited to the user's local environment only in case presence of one or more persons within the region relatively close to the user is detected, or be more extensive in case no presence of one or more persons close to the user is detected. When the user views a light source capable of transmitting coded light that is associated with or corresponds to another user and/or is located relatively far from the user, the user interface may provide an extent of control options for lighting properties of that other light source which may be relatively low in case presence of one or more persons relatively close to that other light source is detected, or relatively high in case no presence of one or more persons relatively close to that other light source is detected.

The extent of control of the environment in the region by means of the control device that is enabled the user by the indication by the user interface to the user of a range of available values representing at least one property of the environment in the region that is adjustable by the control system may be greater the lower the number of persons being present within the region, e.g. the lower the number of persons being present within a predefined distance from the user. For example in an office environment, the extent of control of the environment in the region by means of the control device that is enabled the user may be greater the smaller the number of people or persons currently occupying the desks or workspaces neighboring the user's own desk or workspace.

The communication unit may be adapted to receive a signal from a presence information sensor unit indicative of the presence information. The presence information sensor unit may be adapted to determine the presence information.

The presence information sensor unit may be arranged in the control device. Hence, the control device may in alternative or in addition comprise a presence information sensor unit adapted to determine the presence information. In alternative or in addition, the presence information sensor unit may be arranged separately from the control device, which presence information sensor unit may communicate the sensed presence information to the control device e.g. via the communication unit of the control device.

The presence information sensor unit may for example comprise a presence or motion sensor. Presence or motion detectors or sensors may use different techniques for detecting presence or motion. Examples include but are not limited to Passive Infrared detectors, Ultrasonic motion detectors, detectors based on a combination of Passive Infrared and Ultrasonic techniques, and camera-based sensors. Further examples include detectors based on radar, sound and pressure. For example in a case where the region is an office, the presence information sensor unit may include pressure sensors arranged e.g. in office chairs of the office workers, which pressure sensors can detect if persons are sitting in their respective office chairs.

In alternative or in addition, the presence information sensor unit may for example include, be constituted by, or be based on, a so called active badge system or the like, such as described for example in R. Want et al., "The Active Badge Location System", Journal ACM Transactions on Information Systems, volume 10, issue 1, January 1992, pages 91-102. Such an active badge system may be used to detect presence and location of people e.g. in an office environment, by means of badges or tags worn by the people, which badges or tags can periodically emit pulse-width modulated infrared signals, which are sensed by a plurality of infrared sensors located within the environment and which are capable of sensing infrared signals. Reference is made to the above-mentioned paper by R. Want et al., which is incorporated herein in its entirety.

In alternative or in addition, for example where the region is located in an office environment or the like, the presence information sensor unit may for example be coupled to or in communication with a communication network (e.g., a local area network, LAN) connecting user devices of the office workers in a wired or wireless fashion (e.g., by means of a wireless LAN, WLAN) and be adapted to determine location and/or identity of persons in the region by sensing whether persons have logged into their respective user devices, or if usage of the respective user devices have been detected e.g. within a predefined period. For example, the presence information sensor unit may be adapted to sense whether office workers have inserted their respective user devices into docking stations associated with or corresponding to the respective office workers. The user devices may for example be or include laptops, mobile telephones such as smartphones, etc. According to another example, the presence information sensor unit may be adapted to sense a position of the office workers within the region (e.g. one or several office rooms) by retrieving signals from their respective user devices indicating the location of the respective user devices. For example, the user device, e.g. a smartphone, may include an application adapted to determine its location e.g. based on Global Positioning System (GPS), Wi-Fi (e.g. based on received signal strength indication, RSSI), Bluetooth, and/or Radio Frequency Identification (RFID) means, etc.

In alternative or in addition, the control device, or the communication unit, and/or the user interface may be arranged so as to be able to receive user input indicating presence information. Hence, the presence information may, in alternative or as a complement, be manually input by a user of the user interface and/or the control device.

The user interface may be adapted to selectively indicate to the user a range of available values representing at least one property of the environment in the region that is adjustable by the control system further based on preferences of any persons being present within the region for properties of the environment in the region that are adjustable by the control system.

For example, the user interface may be adapted to selectively indicate to the user a range of available values representing at least one property of the environment in the region that is adjustable by the control system further based on a comparison of preferences of the user for properties of the environment in the region that are adjustable by the control system with preferences of any other persons being present within the region, possibly any persons within a predefined distance from the user and/or any persons within a predefined sub-region in the region, for properties of the environment in the region that are adjustable by the control system.

For example in a case when the presence information indicates that there is a particular, possibly predefined, number of persons neighboring the user or control device, and where all of these neighbors have a preference for lower (or higher) temperatures than an average or predefined or nominal temperature in the region, the user interface may allow the user greater extent of control of temperature in the room or region, at least close to the neighboring persons' locations, e.g. within a temperature interval just below (or above) the average or predefined temperature value. This could be especially relevant e.g. in flexible workplace environments, where the workers have not been assigned workspaces at fixed locations but where the locations at where the users work may vary with time, e.g. from day to day.

In general, in case the presence information indicates that there is a particular, possibly predefined, number of persons neighboring the user or control device, and where the user and the neighboring person(s) share a similar range of preference for one or more properties of the environment in the region, the user interface may allow the user a greater extent of control of the environment in the region by means of the control device with respect to the one or more properties of the environment in the region for which the user and the neighboring persons share a similar range of preference. For example in an office environment or scenario, the user and a person occupying the workspace neighboring the user's workspace may both have a preference for a higher temperature than an average or nominal temperature. The user interface may then be adapted so as to allow the user a greater extent of control of temperature in the region, at least close to the locations of the user and the person occupying the workspace neighboring the user's workspace, e.g. within a temperature interval above the average or nominal temperature value. Generally, in case the user and a person occupying the workspace neighboring the user's workspace both have a certain preference for a particular property of the environment in the region, the user interface may allow the user a greater extent of control of the environment in the region by means of the control device with respect to the property of the environment in the region when other persons (who possibly may not have the same preference for the particular property of the environment in the region) are not present within the region or at least are located relatively far from the user and the other person.

Information on preferences of persons present within the region may be previously determined or predefined and stored in a memory in the control device. In alternative or as a complement, the information may be manually input by a user of the user interface and/or the control device and/or received by the communication unit, e.g. from a database where the information is stored.

The control device may comprise an estimation unit adapted to estimate an effect on the environment in the region of a selection of a chosen value in the range of available values representing at least one property of the environment in the region indicated to the user by the user interface.

In other words, the estimation unit may estimate an effect on the environment in the region that would be the result, or that would be anticipated, in case the user would select a particular value, or values, in the range of available values representing at least one property of the environment in the region that is indicated to the user by the user interface.

The user interface may be adapted to indicate the effect estimated by the estimation unit to the user. Hence, so called 'feed-forward information' may be provided in the user interface to illustrate the impact on the environment in the region resulting from particular user input that the user plans or foresees to provide to the control device. For example, such feed-forward information may be used to illustrate the impact of certain user input on any other persons within the region. For example in a case where the region is located in a building and the control system includes a building management system for controlling and/or monitoring mechanical and/or electrical equipment in the building, and the user is located at or nearby a window, if the user wishes to control blinds at the window (by means of controlling operation of the control system) the user interface may render an effect of decreased light intensity and/or brightness for any other persons situated further away from the window that would be expected as a result from the intended control of the blinds.

The estimation of an effect on the environment in the region by the estimation unit may for example be based on a model for predicting possibilities of effects on the environment in the region resulting from user input planned or foreseen to be provided to the control device via the user interface. With respect to an example of adjusting lighting properties in the region, the model may for example be created in connection to commissioning of a lighting system for providing illumination within the region. For example with respect to an office environment, the installer of the lighting system may for example map lighting effects that a plurality of light sources in the lighting system are able to provide to work plane illuminance at different workspaces or desks within the region.

For the estimation of an effect on the environment in the region, the estimation unit may in alternative or in addition for example utilize a (self-)learning system, or machine learning system, in order to estimate the effect, e.g. using historical sensed data generated by sensors capable of sensing properties of the environment in the region, possibly at runtime.

The presence information may include identity information identifying at least the user within the region.

The user interface may be adapted to selectively indicate to the user a range of available values representing at least one property of the environment in the region that is adjustable by the control system further based on the identity information identifying the user.

Thus, the level of user control of the environment in the region that is provided by the user interface may be personalized, e.g. so as to be based (further) on control privileges of the user. The control privileges may be predefined.

The control device may comprise a memory unit adapted to store data e.g. relating to the user's usage of the control device.

The user interface may be adapted to selectively indicate to the user a range of available values representing at least one property of the environment in the region that is adjustable by the control system further based on at least some of the data stored in the memory unit.

The data relating to the user's usage of the control device may relate to intended use, e.g. include preferences of the user for certain settings of the available values representing at least one property of the environment in the region that is adjustable by the control system, and/or past use, e.g. be derived from usage data gathered during prior operation of the control device by the user.

According to a third aspect of the present invention, there is provided a system comprising a control system, which is adapted to adjust at least one property of the environment in a region within a structure, and a control device according to the first aspect of the present invention for controlling the environment in the region by means of controlling operation of the control system.

The region may for example be a region within a building. Thus, the structure may for example be a building.

The control system may for example include a building management system for controlling and/or monitoring mechanical and/or electrical equipment in the building, as known in the art.

The control system may for example be adapted to control lighting, heating, cooling, humidity, sound level and/or air circulation in the region, wherein the at least one property of the environment in the region includes at least one lighting property, at least one thermal property, at least one acoustic property, humidity, and/or at least one air circulation property.

The at least one lighting property may for example include brightness, glare, color temperature, and/or intensity, etc. of natural or artificial light within the region. The at least one thermal property may for example include a temperature at or close to a specified location within the region (e.g. the user's location) or a temperature distribution within the region. The at least one air circulation property may for example include a measure of the volume of air in the region that is exchanged with the exterior of the region in a given period of time.

To effect changes in the at least one light property, the control system may for example include a light dimmer, a wavelength filter, a color temperature filter, and/or adjustable light-blocking means such as blinds, etc., as known in the art, which may be used to modify properties of natural or artificial light within the region. Artificial light within the region may be generated e.g. by means of a plurality of light sources, which for example can include light emitting diodes (LEDs). The control system may be adapted to selectively switch the light sources on and off. Each of the plurality of light sources may have light emission characteristics that are controllable (e.g. via the control system), e.g. with respect to intensity, color, color temperature, brightness, etc., of light emitted therefrom.

The positions of the plurality of light sources within the region may be communicated to the control device, or the communication unit, from the control system (e.g. including a building management system).

The user interface may be adapted to indicate a 'map' of the light sources within the region, and possibly lighting effects and/or capabilities of the respective light sources, based on the position and type and/or light emission characteristics of the respective light sources. The extent of control of the environment in the region by means of the control device that is enabled the user may further be based on, in addition to the presence information, information on position, type and/or light emission characteristics of the respective light sources as determined by the control system.

To effect changes in air circulation the control system may for example include ventilation equipment or be coupled to ventilation equipment permitting control of ventilation in the region. To effect changes in humidity the control system may for example include a dehumidifier.

According to a fourth aspect of the present invention, there is provided a computer program product adapted to be executed in a processing unit of a control device, which control device is for controlling the environment in a region within a structure by means of controlling operation of a control system adapted to adjust at least one property of the environment in the region. The control device comprises a user interface adapted to selectively indicate to a user a range of available values representing at least one property of the environment in the region that is adjustable by the control system, and enable the user to control the represented at least one property, whereby the control device is provided with user input. The control device may comprise a communication unit adapted to adjust the at least one property by means of communicating a control signal corresponding to the user input to the control system. The processing unit can be coupled to the user interface. The computer program product comprises computer-readable means carrying computer program code configured to, when executed in the processing unit, based at least on presence information of any persons being present within the region, cause the user interface to selectively indicate to the user a range of available values representing at least one property of the environment in the region that is adjustable by the control system, such that the extent of control of the environment in the region by means of the control device that is thereby enabled the user is based at least partly on the presence information.

Further objects and advantages of the present invention are described in the following by means of exemplifying embodiments.

It is noted that the present invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

Exemplifying embodiments of the invention will be described below with reference to the other accompanying drawings.

DETAILED DESCRIPTION

The present invention will now be described more fully hereinafter with reference to the accompanying drawings, in which exemplifying embodiments of the present invention are shown. The present invention may, however, be embodied in many different forms and should not be construed as limited to the embodiments set forth herein; rather, these embodiments are provided by way of example so that this disclosure will convey the scope of the invention to those skilled in the art.

In the following, embodiments of the present invention are described with reference to an example according to which the region is located in a building and includes, or is constituted by, one or more rooms in the building, and where the one or more rooms are one or more office rooms. However, it is to be understood that this example is merely for describing principles of embodiments of the present invention and is not to be considered as limiting for the present invention. Rather, the present invention encompasses cases where the region is not necessarily located in a building, and where the region is not necessarily included in, or constituted by, one or more rooms (such as office rooms) in the structure.

Figure 1:
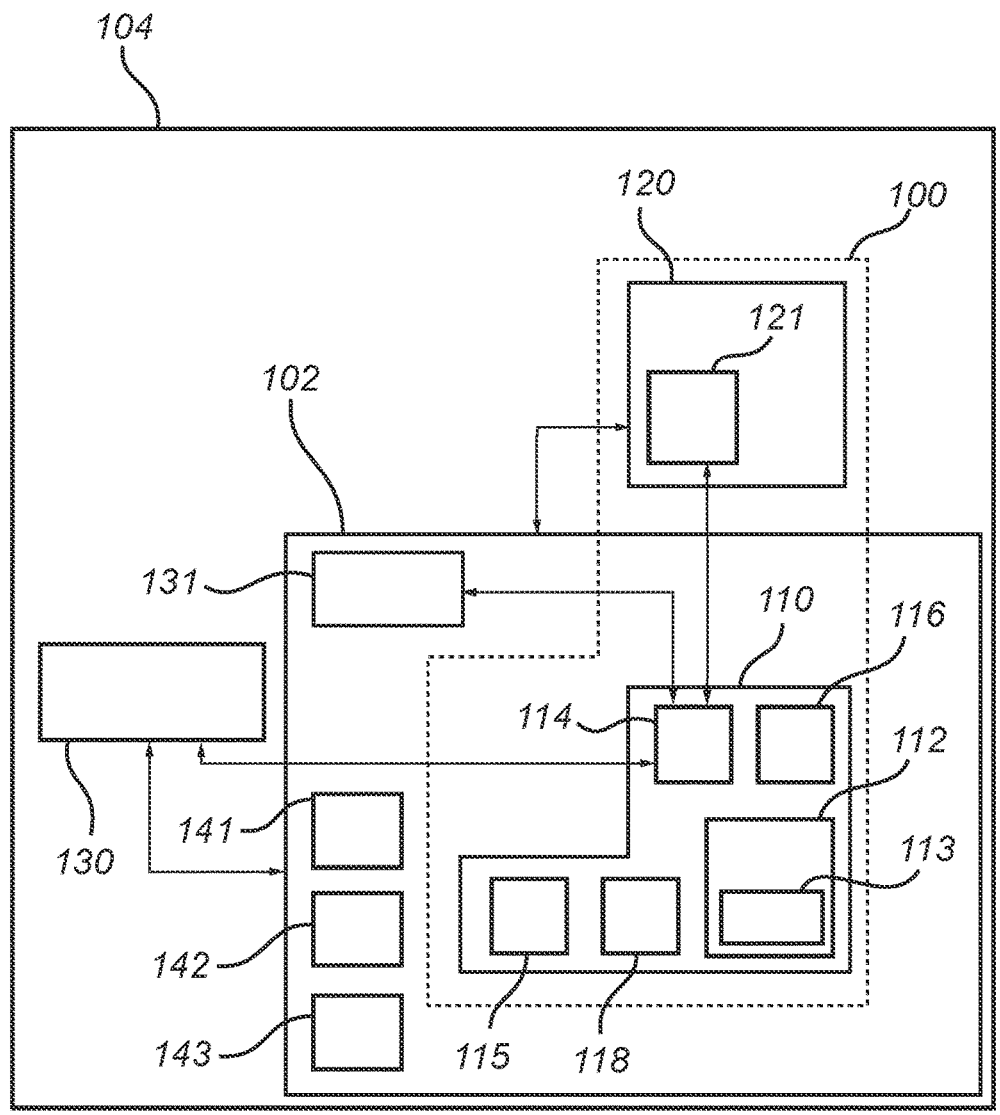
FIG. 1 is a schematic block diagram of a system illustrating embodiments of the present invention.

Referring now to FIG. 1, there is shown a schematic block diagram of a system 100 according to an embodiment of the present invention. It is to be understood that the block diagram depicted in FIG. 1 is schematic and not drawn to scale, and is for illustrating principles of embodiments of the present invention.

The system 100 shown in FIG. 1 comprises a control system 120, which is adapted to adjust at least one property of the environment in a region 102 within a structure 104. The system 100 comprises a control device 110, which is adapted to control the environment in the region 102 by means of controlling operation of the control system 120 (as indicated in FIG. 1 by the arrows between the control system 120 and the region 102, and by the arrows between the control device 110 and the control system 120, respectively). The control device 110 comprises a user interface 112.

For example in a case where the structure 104 is a building, the control system 120 may e.g. include a building management system for controlling and/or monitoring mechanical and/or electrical equipment in the building, as known in the art. The control system 120 may for example be adapted to control lighting, heating, cooling, humidity, sound level and/or air circulation within the region 102. Accordingly, the at least one property of the environment in the region 102 that is adjustable by the control system 120 may for example include at least one lighting property, at least one thermal property, at least one acoustic property, humidity, and/or at least one air circulation property of the environment in the region 102.

The user interface 112 is adapted to selectively indicate to a user (not shown in FIG. 1) a range of available values representing at least one property of the environment in the region 102 that is adjustable by the control system 120. The user interface 112 is adapted to enable the user to control the represented at least one property, whereby the control device 110 is provided with user input.

The control device 110 comprises a communication unit 114 which is adapted to adjust the controlled at least one property by means of communicating one or more control signals corresponding to the user input to the control system 120. The communication unit 114 may be integrally arranged in the user interface 112.

The user interface 112 is adapted to selectively, and/or possibly controllably, indicate to the user a range of available values representing at least one property of the environment in the region 102 that is adjustable by the control system 120 at least based on presence information of any persons (not shown in FIG. 1) being present within the region 102, such that the extent of control of the environment in the region 102 by means of the control device 110 that is thereby enabled the user is based at least partly on the presence information.

In accordance with the embodiment depicted in FIG. 1, the control device 110 may include a control and/or processing unit 113. In FIG. 1 the control and/or processing unit 113 is included in the user interface 112, but this arrangement of the processing unit 113 in the control device 110 is merely according to an example. The control and/or processing unit 113 may be adapted to execute appropriate computer program code configured to, when executed in the control and/or processing unit 113, based at least on presence information of any persons being present within the region 102, cause the user interface 112 to selectively indicate to the user a range of available values representing at least one property of the environment in the region 102 that is adjustable by the control system 120, in such a way that the extent of control of the environment in the region 102 by means of the control device 110 that is thereby enabled the user is based at least partly on the presence information.

The user interface 112 may be adapted to selectively indicate to the user a range of available values representing at least one property of the environment in the region 102 that is adjustable by the control system 120 further based on preferences of any persons being present within the region 102 for properties of the environment in the region that are adjustable by the control system 120. For example, the selective indication by the user interface 112 may be based on a comparison of preferences of the user for properties of the environment in the region 102 that are adjustable by the control system 120 with preferences of any other persons being present within the region 102, possibly any persons within a predefined distance from the user and/or any persons within a predefined sub-region (not shown in FIG. 1) in the region 102, for properties of the environment in the region 102 that are adjustable by the control system 120.

In accordance with the embodiment depicted in FIG. 1, the communication unit 114 may be adapted to receive a signal from one or more presence information sensor units 115, 121, 130, 131 (as partly indicated in FIG. 1 by the arrows between presence information sensor units 121, 130, 131 and communication unit 114, respectively), which each is adapted to determine presence information of any persons being present within the region 102 (as partly indicated in FIG. 1 by the arrows between the control device 120 and the region 102 and between the presence information sensor unit 130 and the region 102), with the respective signal or signals being indicative of the presence information.

As shown in FIG. 1, a presence information sensor unit 115 may for example be included in the control device 110. In alternative or as a complement, a presence information sensor unit 121, 130, 131 may be arranged externally with respect to the control device 110. As shown in FIG. 1, an externally arranged presence information sensor unit 131 may be arranged within the region 102. However, as also shown in FIG. 1, an externally arranged presence information sensor unit 121, 130 may in alternative or in addition be arranged outside the region 102, e.g. in the control system 120 (cf. presence information sensor unit 121), and need not necessarily be included in the system 100 (cf. presence information sensor unit 130).

The presence information sensor unit 131 may for example comprise a presence or motion sensor, e.g. including pressure sensors arranged in office chairs of the office workers, which pressure sensors can detect if persons are sitting in their respective office chairs. In alternative or in addition, any one of the presence information sensor units 115, 121, 130, 131 may be included in an active badge system such as described in the foregoing, which may be used to detect presence and location of people in the office(s) by means of badges or tags worn by the office workers, which badges or tags can periodically emit pulse-width modulated infrared signals, which are sensed by a plurality of infrared sensors.

According to another example, any one of the presence information sensor units 115, 121, 130, 131 may be coupled to or in communication with a communication network, e.g., a LAN (not shown in FIG. 1) connecting user devices (e.g. including the control device 110) of the office workers in a wired or wireless fashion (e.g., by means of a WLAN) and be adapted to determine location and/or identity of persons in the region 102 by sensing whether persons have logged into their respective user devices, or if usage of the respective user devices have been detected within a predefined period. For example, any one of the presence information sensor units 115, 121, 130, 131 may be adapted to sense whether office workers have inserted their respective user devices into docking stations (not shown in FIG. 1) associated with or corresponding to the respective office worker, and/or sense a position of the office workers within the region 102 by retrieving signals from their respective user devices indicating the location of the respective user devices. The user devices may for example be laptops, mobile telephones such as smartphones, etc. A user device such as a smartphone may include an application adapted to determine its location e.g. based on GPS, Wi-Fi, Bluetooth, and/or RFID means, etc.

In accordance with the embodiment depicted in FIG. 1, the control device 110 may comprise an estimation unit 116. The estimation unit 116 is optional. The estimation unit 116 is adapted to estimate an effect on the environment in the region 102 resulting from a selection of a chosen value or values in the range of available values representing at least one property of the environment in the region 102 which is indicated to the user by the user interface 112. Hence, the estimation unit 116 can estimate an effect on the environment in the region 102 that would be the result in case the user would select a particular value or values in the range of available values representing at least one property of the environment in the region 102 that is indicated to the user by the user interface 112. The user interface 112 may be adapted to indicate to the user the effect which has been estimated by the estimation unit 116. Thereby, so called 'feed-forward information' may be provided in the user interface 112 to illustrate the impact on the environment in the region 102 resulting from user input that the user plans or foresees to provide to the user interface 112. The estimation unit 116 may be integrally arranged e.g. in the user interface 112.

In accordance with the embodiment depicted in FIG. 1, the control device 110 may comprise a memory unit 118. The memory unit 118 may be adapted to store e.g. data relating to the user's usage of the control device 110. The memory unit 118 is optional.

The user interface 112 may be adapted to selectively indicate to the user a range of available values representing at least one property of the environment in the region 102 that is adjustable by the control system 120 further based on at least some of the data stored in the memory unit 118. Data relating to the user's usage of the control device 110 may relate to intended use, e.g. include preferences of the user for certain settings of the available values representing at least one property of the environment in the region 102 that is adjustable by the control system 120, and/or past use, e.g. be derived from usage data gathered during prior operation of the control device 110 by the user.

Although principles of embodiments of the present invention have been described mainly with reference to one control device 110, which may correspond to or be associated with a particular user or person within the region 102 in the structure 104, it is to be understood that within the region 102 there may be additional control devices 141, 142, 143, which each may correspond to or be associated with a particular user or person within the region 102 in the structure 104. For example, each of the control devices 110, 141, 142, 143 may correspond to or be associated with different users or persons within the region 102 in the structure 104. One or more of the control devices 141, 142, 143 may be included in the system 100 (not indicated in FIG. 1). Each of the control devices 141, 142, 143 may be substantially similar to or the same as control device 110, and operate in a similar manner or in the same manner as control device 110. Although FIG. 1 by way of example shows three additional control devices 141, 142, 143, it is to be understood that there may be one, two, three, four, or five or more additional control devices within the region 102 in the structure 104.

Figure 2:
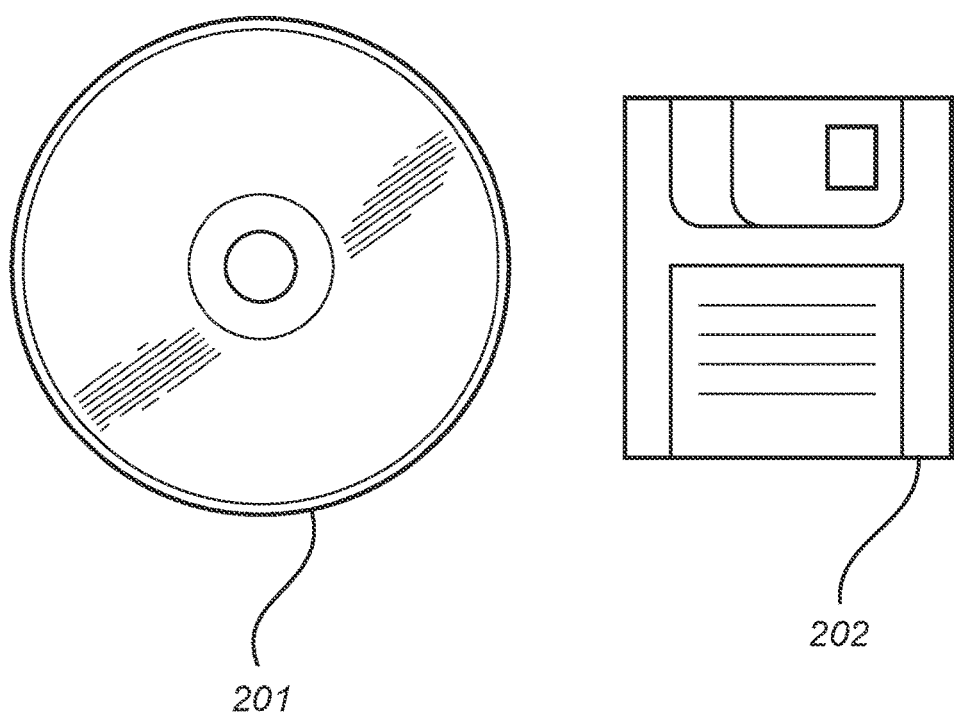
FIG. 2 is a schematic view of computer-readable means, or computer-readable storage mediums, according to embodiments of the present invention.

Referring now to FIG. 2, there is shown a schematic view of computer-readable means, or computer-readable storage mediums, 201, 202 according to embodiments of the present invention. By way of example, the computer-readable storage mediums 201, 202 comprise a floppy disk 201 and a Digital Versatile Disc (DVD) 202. With reference to FIG. 1, control device 110 may include a control and/or processing unit 113. On the computer-readable storage mediums 201, 202 there are stored computer program code configured to, when executed in the control and/or processing unit 113 of the control device 110, based at least on presence information of any persons being present within the region 102, cause the user interface 112 to selectively indicate to the user a range of available values representing at least one property of the environment in the region 102 that is adjustable by the control system 120, such that the extent of control of the environment in the region 102 by means of the control device 110 that is thereby enabled the user is based at least partly on the presence information.

Although two particular types of computer-readable storage mediums 201, 202 by way of example have been described above with reference to FIG. 2, the present invention encompasses embodiments employing any other suitable type of computer-readable storage medium, such as, but not limited to, a memory, a hard disk drive, a Compact Disc (CD), a flash memory, magnetic tape, a USB stick, a Zip drive, etc. The memory may for example be any combination of read and write memory (RAM) and read only memory (ROM).

In conclusion, there is disclosed a control device for controlling the environment in a region within a structure by means of controlling operation of a control system, which is adapted to adjust at least one property of the environment in the region. The control device comprises a user interface adapted to selectively indicate to a user a range of available values representing at least one property of the environment in the region that is adjustable by the control system at least based on presence information of any persons being present within the region such that the extent of control of the environment in the region by means of the control device that is thereby enabled the user is based at least partly on the presence information.

While the present invention has been illustrated and described in detail in the appended drawings and the foregoing description, such illustration and description are to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A control device comprising:
    a user interface adapted to:
        selectively indicate to a user a range of available values representing at least one property, of an environment in a region, that is adjustable; and
        enable the user to control the represented at least one property, whereby the control device is provided with user input; and
    at least one hardware processor adapted to adjust the at least one property by means of communicating a control signal corresponding to said user input;
    wherein the user interface is adapted to selectively indicate to the user the range of available values representing the at least one property of the environment in the region that is adjustable at least based on presence information of any persons being present within the region such that the an extent of presentation of said range by said user interface to enable control of the property via selection of at least one of said values within said extent by the user is based at least partly on the presence information;
    wherein the extent of the presentation of said range is greater the lower the number of persons being present within the region.

2. A control device according to claim 1, wherein the user interface is configured to adapt the number and/or type of properties and/or the range of available values of the respective properties which are indicated to the user by the user interface at least based on the presence information.

3. A control device according to claim 1, wherein, on a condition that the user is located within the region, the extent of the presentation of said range is greater the lower the number of persons being present within a predefined distance from the user.

4. A control device according to claim 1, wherein the at least one hardware processor is adapted to receive a signal from a presence information sensor indicative of the presence information, the presence information sensor being adapted to determine the presence information.

5. A control device according to claim 1, wherein the user interface is adapted to selectively indicate to the user said range further based on preferences of any persons being present within the region for properties of the environment in the region that are adjustable.

6. A control device according to claim 5, wherein the user interface is adapted to selectively indicate to the user said range further based on a comparison of preferences of the user for properties of the environment in the region that are adjustable with preferences of any other persons being present within the region for properties of the environment in the region that are adjustable.

7. A control device according to claim 1, wherein the at least one hardware processor is adapted to estimate an effect on the environment in the region of a selection of a chosen value in the range;
    wherein the user interface is further adapted to indicate to the user the effect estimated by the at least one hardware processor.

8. A control device according to claim 1, wherein the presence information includes identity information identifying at least the user within the region, and wherein the user interface is adapted to selectively indicate to the user said range further based on the identity information identifying the user.

9. A control device according to claim 1, further comprising:
    a memory adapted to store data relating to the user's usage of the control device;
    wherein the user interface is adapted to selectively indicate to the user said range further based on at least some of the data stored in the memory.

10. A user interface for a control device, the user interface being adapted to:
    selectively indicate to a user a range of available values representing at least one property, of an environment in a region, that is adjustable; and
    enable the user to control the represented at least one property, whereby the control device is provided with user input, wherein the control device comprises at least one hardware processor that is adapted to adjust the at least one property by means of communicating a control signal corresponding to said user input;
    wherein the user interface is adapted to selectively indicate to the user the range of available values representing the at least one property of the environment in the region that is adjustable at least based on presence information of any persons being present within the region such that an extent of presentation of said range by said user interface to enable control of the property via selection of at least one of said values within said extent by the user is based at least partly on the presence information;
    wherein the extent of the presentation of said range is greater the lower the number of persons being present within the region.

11. A controller system comprising:
    the control device according to claim 1; and
    at least one system hardware processor of a control system, wherein the system hardware processor is adapted to adjust the at least one property of the environment.

12. A controller system according to claim 11, wherein the region is in a building, and wherein the control system includes a building management system including at least one second hardware processor configured to control and/or monitor mechanical and/or electrical equipment in the building.

13. A controller system according to claim 11, wherein the system hardware processor is adapted to control lighting, heating, cooling, humidity, sound level and/or air circulation in the region, wherein the at least one property of the environment in the region includes at least one lighting property, at least one thermal property, at least one acoustic property, humidity and/or at least one air circulation property.

14. A computer program product embodied on a non-transitory computer-readable medium and adapted to be executed by at least one hardware processor of a control device, the control device comprising a user interface adapted to selectively indicate to a user a range of available values representing at least one property, of an environment in a region, that is adjustable, and enable the user to control the represented at least one property, whereby the control device is provided with user input, the at least one hardware processor being adapted to adjust the at least one property by means of communicating a control signal corresponding to said user input, the at least one hardware processor being coupled to the user interface;

the computer program product comprising computer program code configured to, when executed by the processor, based at least on presence information of any persons being present within the region, cause the user interface to selectively indicate to the user the range of available values representing the at least one property, such that an extent of presentation of said range by said user interface to enable control of the property via selection of at least one of said values within said extent by the user is based at least partly on the presence information;

wherein the extent of the presentation of said range is greater the lower the number of persons being present within the region.

* * * * *